United States Patent
Patel et al.

(10) Patent No.: US 11,201,497 B2
(45) Date of Patent: Dec. 14, 2021

(54) APPARATUS AND METHODS TO REDUCE CURRENT TRANSIENT DURING POWER MODE TRANSFER IN UNINTERRUPTIBLE POWER SUPPLY

(71) Applicant: Hitachi, Ltd., Tokyo (JP)

(72) Inventors: Prashant Patel, Bangalore (IN); Utsav Ramchandra Patel, Gandhinagar (IN); Premal Patwa, Gandhinagar (IN)

(73) Assignee: HITACHI, LTD., Tokyo (JP)

( * ) Notice: Subject to any disclaimer, the term of this patent is extended or adjusted under 35 U.S.C. 154(b) by 276 days.

(21) Appl. No.: 16/269,581

(22) Filed: Feb. 7, 2019

(65) Prior Publication Data

US 2019/0260228 A1 Aug. 22, 2019

(30) Foreign Application Priority Data

Feb. 20, 2018 (IN) .............................. 201821006391

(51) Int. Cl.
*H02J 9/06* (2006.01)

(52) U.S. Cl.
CPC .............. *H02J 9/062* (2013.01); *H02J 9/061* (2013.01)

(58) Field of Classification Search
CPC ... H02J 9/062; H02J 9/061; H02J 3/40; Y02B 70/30; Y04S 20/20; H02M 7/125; H02M 1/083
See application file for complete search history.

(56) References Cited

U.S. PATENT DOCUMENTS 5,465,011 A * 11/1995 Miller ................. H02M 7/4807
307/64
9,837,855 B2 12/2017 Prakash et al.

FOREIGN PATENT DOCUMENTS

IN 201641025900 2/2018

OTHER PUBLICATIONS

Indian Office Action received in corresponding Indian Application No. 20182100631 dated Nov. 14, 2019.

* cited by examiner

*Primary Examiner* — Daniel Cavallari
(74) *Attorney, Agent, or Firm* — Mattingly & Malur, PC (57) ABSTRACT

An apparatus and methods to reduce current transient during power mode transfer in uninterruptible power supply (UPS). The disclosure provides a zero-cross detection based phase width modulated (PWM) element (E3). The element (E3) is configured to delay activation of a PWM modulator, by delaying a PWM start command for a first delay time ($T_{dz}$), wherein the first delay time is the time between receiving a static switch command to the time when a positive sequence component of a phase load current crosses zero. The element (E3) is further configured to delay the activation of the PWM modulator for a second delay time ($T_{di}$) after the end of the first delay time ($T_{dz}$), by delaying the PWM start command for the second delay time, wherein the second delay time is based on a power factor of load connected to the UPS.

9 Claims, 9 Drawing Sheets

APPARATUS AND METHODS TO REDUCE CURRENT TRANSIENT DURING POWER MODE TRANSFER IN UNINTERRUPTIBLE POWER SUPPLY

TECHNICAL FIELD

The present application generally relates to uninterruptable power supply (UPS). Particularly, the application discloses a method and apparatus to reduce/eliminate current transient generated at the time of transition from bypass and inverter mode in UPS.

BACKGROUND

Normally the UPS operates in two modes: Normal mode and Bypass mode. During normal operation, all the power supplied to the load passes through the rectifier/charger and inverter that together perform a double conversion (AC-DC-AC), whereas in Bypass mode, the load power is transferred to the bypass AC input (supplied with utility or standby power, depending on the installation). This happens in the event of the following: i) UPS Rectifier/Inverter failure, ii) PWM-stop command is executed, iii) Load-current transients (inrush or fault currents) . . . etc.

In normal mode, during the presence of a bypass, the UPS must be synchronized with the bypass power to ensure load-supply continuity. When the UPS transitions into bypass mode, a disturbance on the AC input source may be transmitted to the load because the inverter no longer steps in. Similarly, again when inverter transitions back to inverter mode and a disturbance on the load supply may be transmitted to the inverter and it may damage the inverter because of high current spike. This current spike might damage inverter switches. This current spike affects the system reliability and continuity of the load supply.

Moreover, this problem becomes more severe in parallel-connected UPS's, as, in parallel-connected UPS every UPS has to transfer at the same instant. Further, this current transient problem becomes more severe in case of non-linear and reactive power load.

Generally, the UPS is equipped with two statics switches: one in bypass path and one in inverter path; and the thyristors (SCR) are generally used as static switches. Further, along with those static switches, the gate driver circuit is required to operate the thyristors. In normal running condition the voltage drop across the thyristors is generally 0.9 to 1V, hence, it can reduce the system efficiency by approximately 1%. Therefore, there is a need to remove one of the static switches and manage the required functionality through one static switch to increase UPS efficiency by approximately 1%. To consider this point, the static switch from the inverter path is removed as shown in FIG. 1.

Consequently, inverter becomes more trivial as there is no provision for an inverter soft start, hence, minor mismatch in voltage magnitude, voltage phase and voltage frequency can create huge current spike/transient. To overcome this challenge many methods have been adopted such as: 1) Passive method: provision of inductor, transformers, 2) Active method: magnitude and phase matching control 3) Hybrid method: magnetics along with magnitude and phase matching circuit. Of these three methods, Active method is widely used as this method doesn't require additional hardware. Considering the aforementioned, some inverters use only active method with either magnitude or phase machining control. Further, the phase calculation known in the state of the art is not dynamic with varying load condition hence sometimes it is crucial to do transfer operation.

Figure 1:
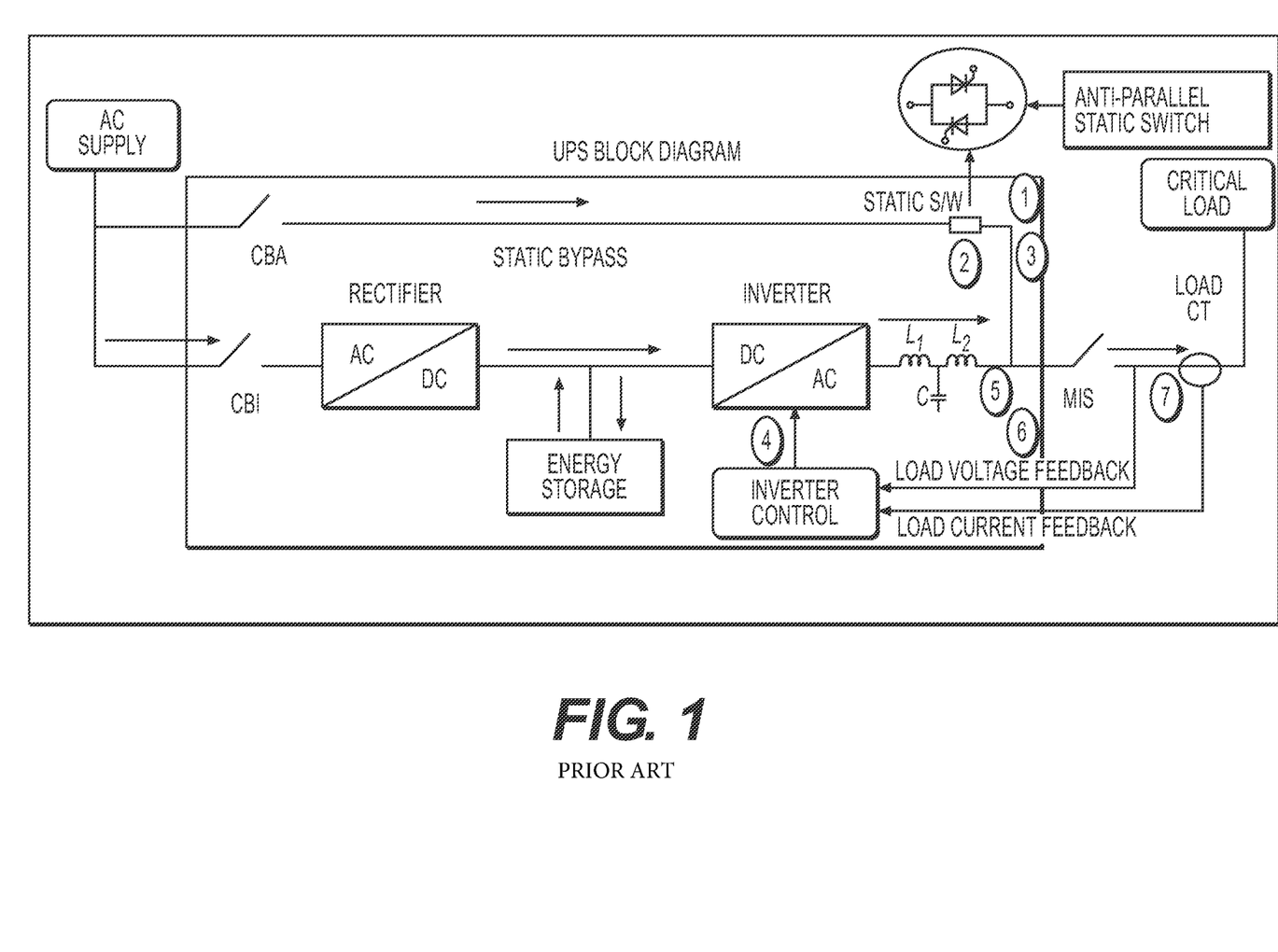
FIG. 1 shows an illustrative example of a standalone UPS system.

Referring to FIG. 1, the working of a traditional UPS is defined first the circuit breaker alternate (CBA) and circuit breaker input (CBI) are turned on. Consequently, the main inventor switch (MIS) is turned on. As soon as the MIS is turned on the bypass static switch is fired and load gets supply from the bypass supply. After certain delay (for example delay based on the pre-charge time period of the connected load) the supply has been transferred from bypass to inverter. Next, once the bypass static switch OFF command is generated, the inverter ON command is also generated at the same instant. However, once the thyristors received OFF command it does not switch off immediately, instead the thyristors are turned off after it becomes reverse biased.

Further, due to the turn on and turn off delay of static switch the bypass source and inverter source will get momentarily shorted and this is the reason for generation of high current spike. In an ideal case where both bypass and inverter voltages are exactly similar in shape (i.e. in terms of phase, frequency and magnitude), the bypass to inverter voltage transfer can occur smoothly. However, in practice two waveforms cannot match exactly as these waveforms are practically different due to distortion, harmonic contents and noise. Due to such mismatches, the momentary shortage of two voltage sources generates a transient spike.

Figure 2:
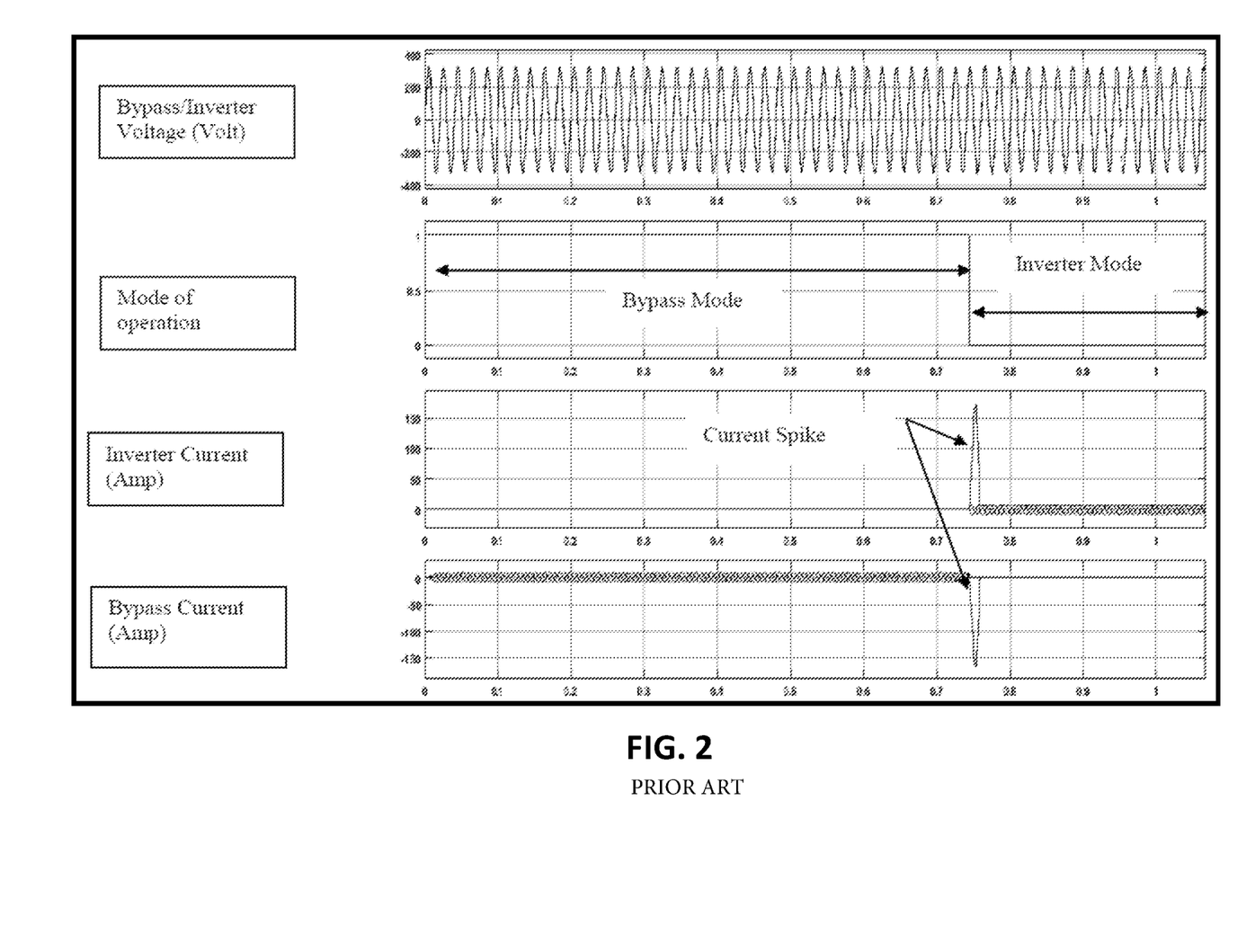
FIG. 2 shows an illustrative example of a traditional load transfer operation using MATLAB.

Referring now to FIG. 2, an example MATLAB representation of traditional mode transfer is shown. In FIG. 2 the bypass mode is transferred to inverter mode at 7.435 sec. Before 7.435 sec the load gets supply from bypass and at 7.435 sec the bypass to inverter transfer command is generated. Therefore, at 7.435 sec the bypass static switch OFF command is generated and the inverter start commands is also released. The inverter, on receiving the ON command, immediately generates the voltages but the thyristors are turned off only after they become reverse biased by natural commutation. Hence during that instant, the bypass source and inverter source gets short circuited and results into high current spike as shown in FIG. 2. Further, this current spike triggers a sat-trip command to the inverter and stops the inverter operation. Hence, the continuity of load supply gets interrupted. Moreover, this current spike may damage the inverter switches in case sat trip protection fails to detect the current spike.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides apparatus and methods to reduce current transient during power mode transfer in an uninterruptible power supply (UPS).

In one embodiment, an uninterruptible power supply (UPS) comprising a zero-cross detection based phase width modulated (PWM) element (E3) is disclosed. The element (E3) may be configured to delay activation of a PWM modulator, by delaying a PWM start command for a first delay time (Tdz). In one aspect the first delay time is the time between receiving a static switch command to the time when a positive sequence component of a phase load current crosses zero. Further the element (E3) may be configured to delay, the activation of the PWM modulator for a second delay time (Tdi) after the end of the first delay time (Tdz), by delaying the PWM start command for the second delay time, wherein the second delay time is based on a power factor of load connected to the UPS.

In another embodiment the present disclosure provides a UPS comprising a phase modifier element (E1). In an aspect the phase modifier element may be configured to measure an inverter voltage and a bypass voltage of the UPS wherein the UPS is switched on such that an inverter of the UPS is synchronized with bypass supply at no load. The element (E1) may further be configured to calculate a phase difference between the inverter voltage and bypass voltage based on the measurement. Further, the element (E1) may further be configured to generate an updated phase information based on the calculated phase difference and a phase information generated by a phased locked loop (PLL) element of the UPS.

In another embodiment the present disclosure provides an UPS comprising a reference voltage magnitude modifier element (E2). In one aspect the reference voltage magnitude modifier element (E2) may be configured to measure the bypass voltage of the UPS and set an inverter reference voltage at two volts higher than the measured bypass voltage. The element (E2) may further be configured to transfer the UPS from bypass mode to inverter mode and wait for a predefined time period; and change the inverter reference voltage to 340V peak (240 $V_{rms}$) at a predetermined slew rate after the predetermined time period has elapsed.

In yet another embodiment the present disclosure provides a method to reduce current transient generated at the time of transition of a UPS from bypass to inverter mode, said method comprising delaying, activation of a PWM modulator, by delaying a PWM start command for a first delay time (Tdz). In one aspect the first delay time is the time between receiving a static switch command to the time when a positive sequence component of a phase load current crosses zero. Further the disclosed method comprises delaying, the activation of the PWM modulator for a second delay time (Tdi) after the end of the first delay time (Tdz), by delaying the PWM start command for the second delay time, wherein the second delay time is based on a power factor of load connected to the UPS.

In another aspect of the present disclosure the method to reduce current transient generated at the time of transition of a UPS from bypass to inverter mode further comprises measuring an inverter voltage and a bypass voltage of the UPS wherein the UPS is switched on such that an inverter of the UPS is synchronized with bypass supply at no load. Further the disclosed method comprises calculating a phase difference between the inverter voltage and bypass voltage based on the measurement and generating, an updated phase information based on the calculated phase difference and a phase information generated by a phased locked loop (PLL) element of the UPS.

In yet another aspect of the present disclosure the method to reduce current transient generated at the time of transition of a UPS to bypass and inverter modes further comprises measuring a bypass voltage of the UPS and setting an inverter reference voltage at two volts higher than the measured bypass voltage. Further the disclosed method comprises, transferring the UPS from bypass mode to inverter mode and wait for a predefined time period and changing the inverter reference voltage to 340V peak (240 $V_{rms}$) at a predetermined slew rate after the predetermined time period has elapsed.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the accompanying Figures inter-operate as explained in more detail below. Before setting forth the detailed explanation, however, it is noted that all of the discussion below, regardless of the particular implementation being described, is exemplary in nature, rather than limiting. For example, although selected aspects, features, elements or components of the implementations depicted may be processed by one or more general or special purpose processors, DSP's, FPGA's ASIC's and the like.

Method steps of the invention may be performed by one or more computer processors to perform functions of the invention by operating on input and generating output. Suitable processors include, by way of example, both general and special purpose microprocessors. Generally, the processor receives (reads) instructions and data from a memory (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays).

Figure 3:
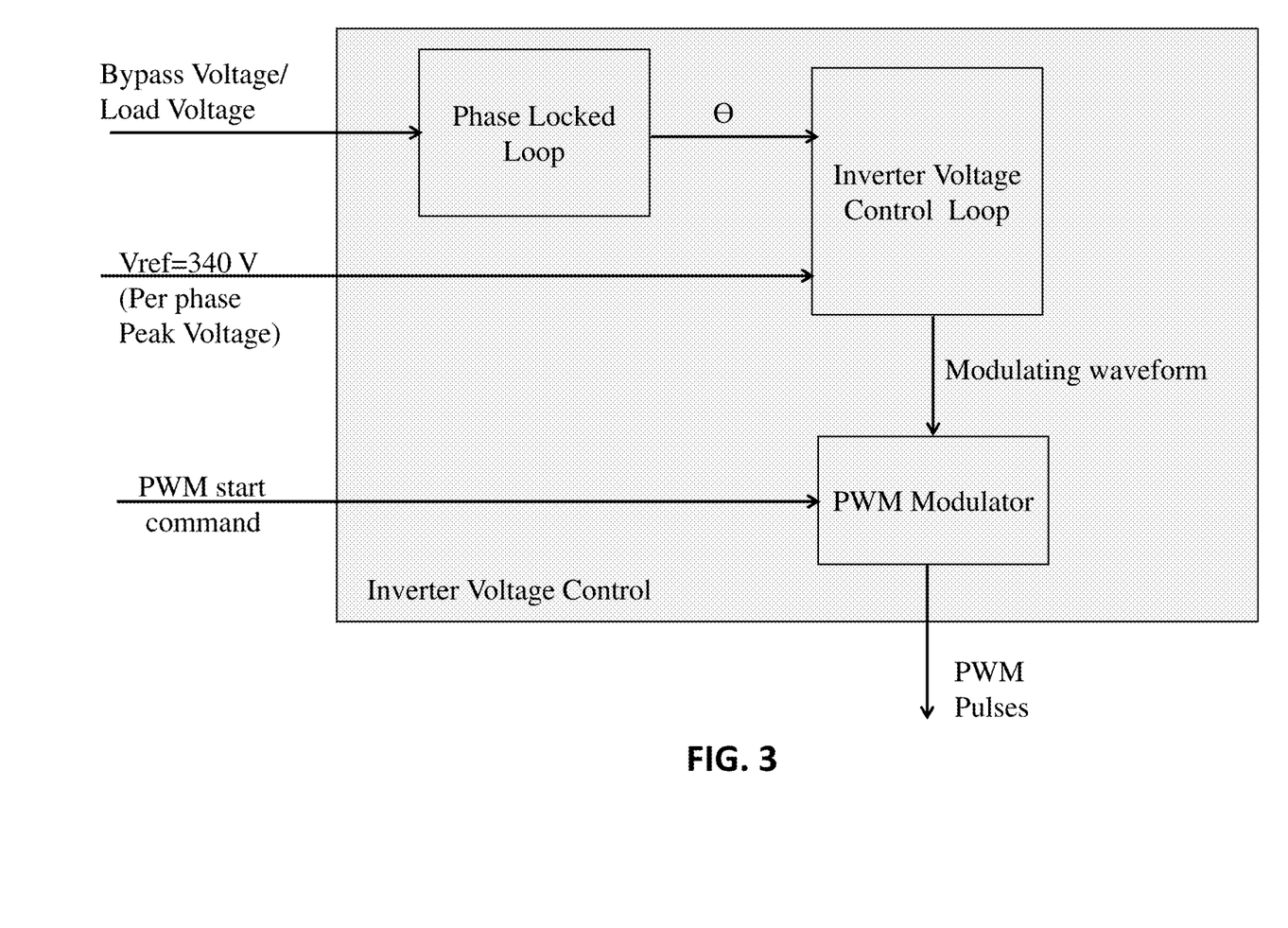
FIG. 3 shows an illustrative example of the basic control diagram of UPS inverter.

Firstly, reference is made to FIG. 3, which shows a basic control diagram of a UPS inverter. The phased locked loop block shown in the FIG. 3 requires either a bypass or load voltage feedback with whom it requires to sync. Further, as shown in FIG. 3, the inverter voltage control loop requires voltage reference information and theta information (phase information) to run its control. The inverter voltage control loop generates modulating waveforms and sends it to the PWM (phase width modulation) modulator. Moreover, the PWM modulator requires a start command, which depends on various health conditions related to the inverter, to generate the PWM pulses for inverter switches.

Figure 4:
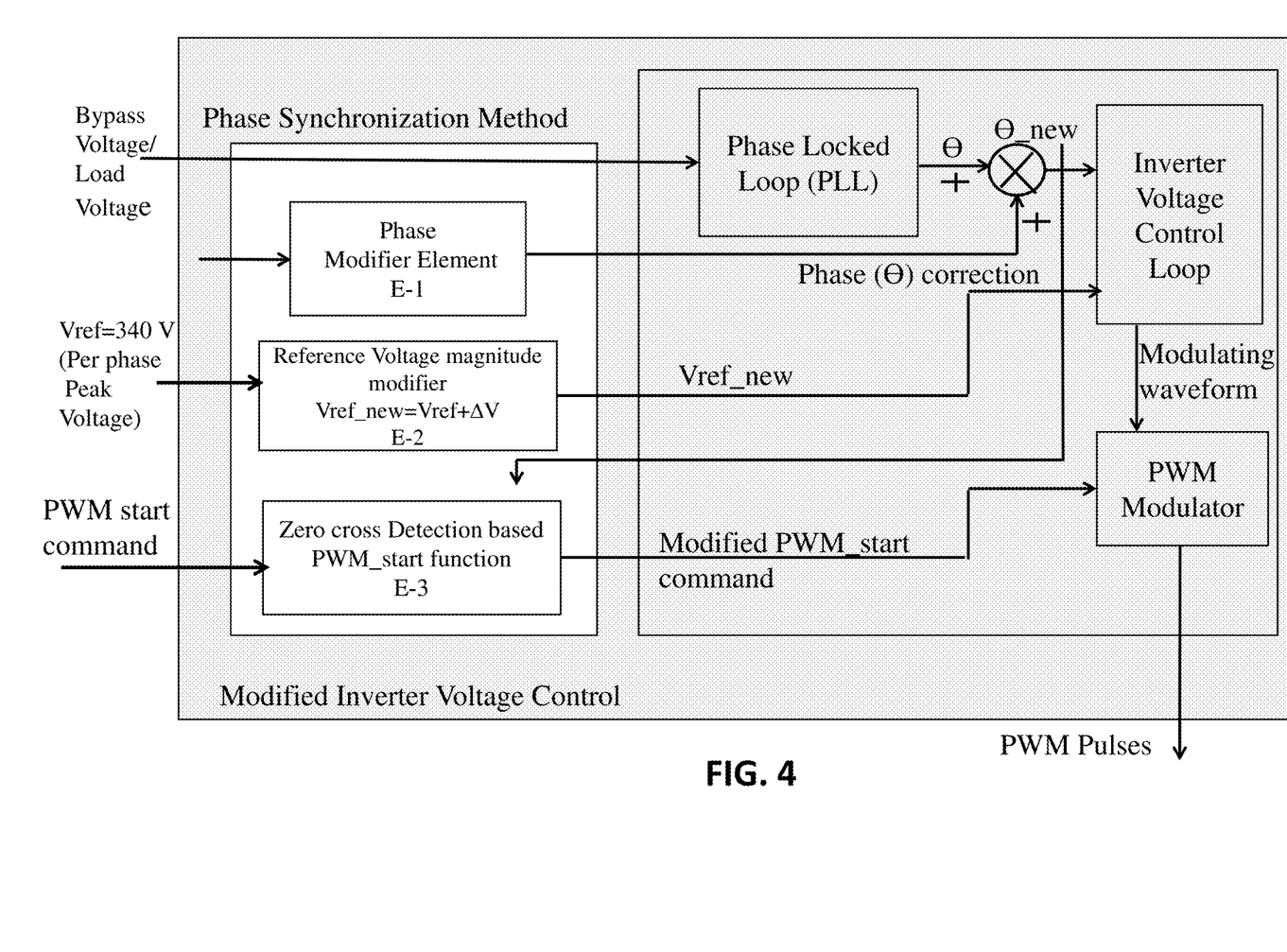
FIG. 4 shows an illustrative representation of the proposed modifications to the control of UPS inverter, in accordance of an embodiment of the present disclosure.

The present application provides an apparatus and method for reducing current transient generated due at the time of transition of a UPS from bypass mode to normal/inverter mode. In an embodiment the disclosed method provides for additional elements to be added into the structure of the control of UPS inventor illustrated in FIG. 3. An illustrative representation of the proposed modifications is shown in FIG. 4. The proposed method and apparatus modifies the traditional methods in order to eliminate/reduce the high current spike produced while transferring from bypass to inverter mode and vice-versa. In addition, the disclosed method and apparatus also overcomes the disadvantage of a fixed delay time as known in the state of the art. Instead, the disclosed method proposed two delays of the PWM start command.

Figure 6:
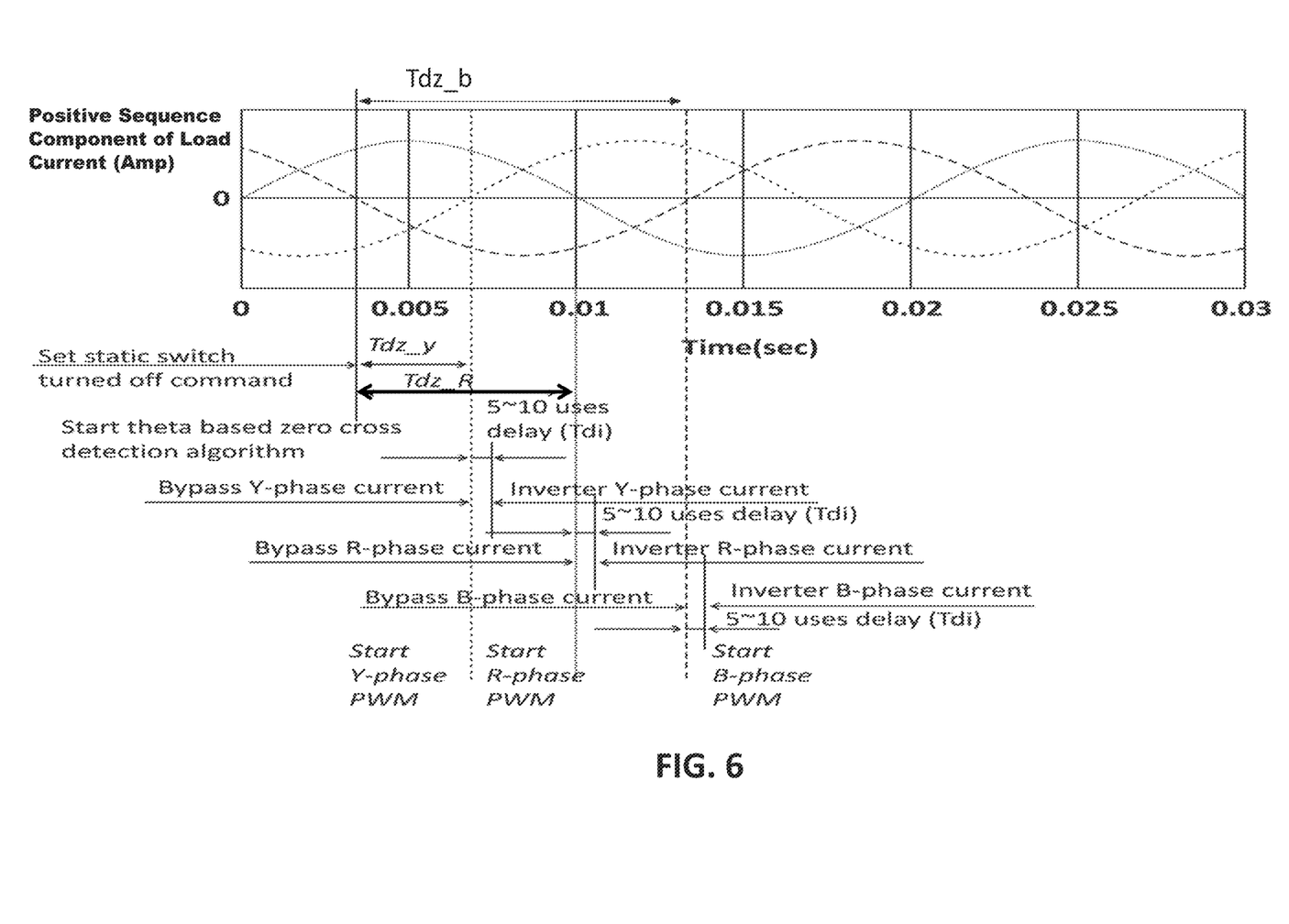
FIG. 6 shows an illustrative MATLAB simulation for time frame understanding of the working of zero-cross detection based phase width modulated (PWM) element, in accordance of an embodiment of the present disclosure.

As shown in the illustrative example of FIG. 4, the disclosed apparatus may comprise three additional components viz. a Phase Modifier Element (E1), a Reference Voltage magnitude modifier Element (E2), and a Zero cross detection based PWM element (E3). These elements are used modify the inputs which are provided to the conventional control of a UPS inverter. In an embodiment the disclosed zero-cross detection based phase width modulated (PWM) element (E3) is configured to delay, activation of a PWM modulator, by delaying a PWM start command for a first delay time (Tdz). In an aspect, the first delay time is the time between receiving a static switch command to the time when a positive sequence component of a phase load current crosses zero. The first delay ($T_{dz}$) of the PWM start command is based on the zero-crossing point of load current and therefore is a variable delay. This first delay assists the thyristor to turn off successfully. Here in an aspect, instead of voltage zero cross, the current zero cross may be preferred because the thyristor may be turned off only after the current passing through it reverses its direction. Moreover, this $T_{dz}$ is different for all three phases (for example as shown in FIG. 6) as they depend on the zero cross of the respective phase current.

Further zero-cross detection based phase width modulated (PWM) element (E3) may also be configured to delay, the activation of the PWM modulator for a second delay time ($T_{di}$) after the end of the first delay time ($T_{dz}$), by delaying the PWM start command for the second delay time ($T_{di}$), wherein the second delay time is based on a power factor of load connected to the UPS. In an aspect, once the zero cross is detected the second delay time ($T_{di}$) is added to avoid any possibility of overlapping of bypass voltage and inverter voltage. In another aspect, this second intentional delay time may vary from 5 microseconds to 10 microseconds based on the power factor of the load. The delay of 5 μsec may be used for the unity power factor load and the 10 μsec delay may be used for the 0.8 pf load as the UPS power factor usually ranges between 0.8 pf lag to 0.8 pf lead. Well know methods to decide the delay time from the range of 5 to 10 micro seconds may be used based on type of load. In one aspect, the extreme range delay may be preferred to avoid the safe turn off of the bypass static switch.

In an embodiment the extreme range of delay may be preferred to avoid the safe turn off of the bypass static switch. The element (E3) may make this determination. After both delay time elapse, the inverter may start PWM pulses of that particular phase by raising the PWM start command.

According to an embodiment of the present disclosure, the inverter PWM start command is generated only after the respective zero cross of positive sequence component of individual phase current is detected. This delay is called delay because of the zero-cross detection of load current and indicated as $T_{dz}$. Here the zero-cross detection of fundamental current may be used, because the thyristor turn off also depends on the types of load. For example, for non-unity power factor load the current is not in phase with voltage hence the thyristor will remain turn on till current through it becomes reverse bias.

Further the inverter must be started immediately after the bypass thyristor is turned off to avoid interruption of the continuity of load supply voltage. Hence, the zero cross of current must be accurately be detected. It is difficult to detect zero cross for non-linear load current and also for the lower load current as there is a chance of multiple zero cross detection(s). In order to overcome the aforementioned difficulty, a fundamental current may be derived using alpha-beta to dq and dq to alpha-beta transformation.

Figure 5:
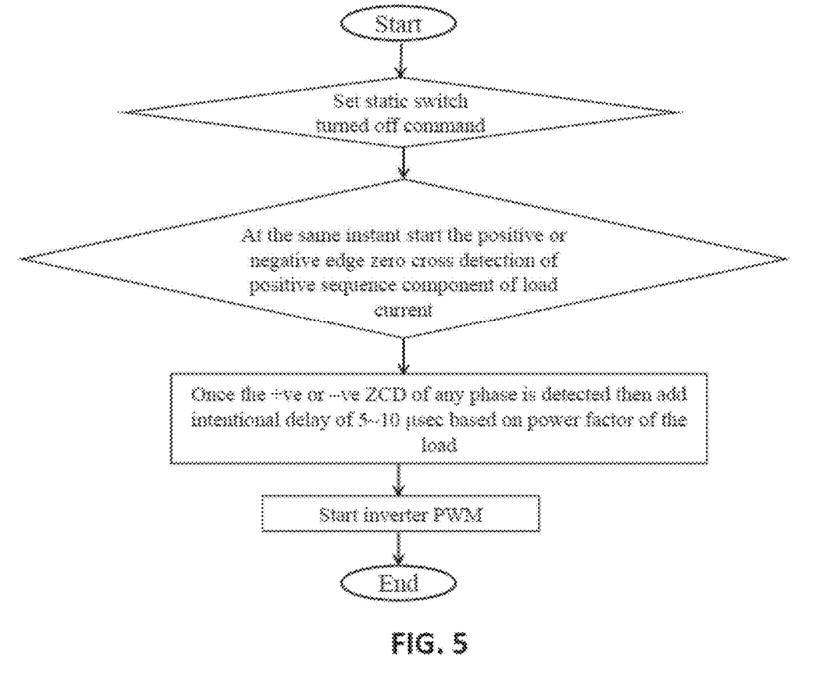
FIG. 5 shows an example of steps of working of zero cross detection based PWM start element (E3)

Furthermore, the second delay time is also provided after the detection of zero cross of current waveform, to assure safe turn off of bypass thyristor before the inverter gets started wherein the second delay time is from a range of 5 microseconds to 10 microseconds based on the power factor of load. An example of steps of working of zero cross detection based PWM start element (E3) is illustrated in FIG. 5.

Further reference is made to FIG. 6, where the time frame understanding of the working of element E-3 is shown with the help of an illustrative MATLAB simulation. In FIG. 6, The vertical line between 0 and 0.005 indicates the time at which the static switch OFF command is generated. After this instant the PWM-start function is activated. The disclosed element (E3) is configured to determine the very next zero crossing whether it is rising or falling zero cross detection. As shown in FIG. 6, after zero cross detection starts, first the Y-phase zero cross is detected and later on R-phase and B-phase zero crosses are detected respectively.

These delays are marked as $T_{dz\_Y}$, $T_{dz\_R}$ and $T_{dz\_B}$. As shown in FIG. 6, these three delays are different in value and are decided based on the zero cross of the particular phase current. After this delay the intentional time delay $T_{di}$ is added to avoid any chance of overlapping of bypass and inverter voltages. This delay is decided based on the power factor of the load as explained above. After these two delays, the PWM of the respective phase is started. As a result, the Y-phase, R-phase and B-phase PWM may start consecutively.

As shown in FIG. 4, the disclosed apparatus comprises a phased locked loop (PLL) is used to synchronize the inverter voltage with the grid voltage in terms of phase and frequency. Based on the phase information provided by PLL, the inverter generates a modulating voltage which is synced with the bypass voltage. This modulating voltage passes through the LC/LCL filter. Due to this the inverter modulating waveform is delayed in comparison to the grid voltage. Hence, to compensate for this delay a phase modifier element (E1) may be included as shown in FIG. 4.

Figure 7:
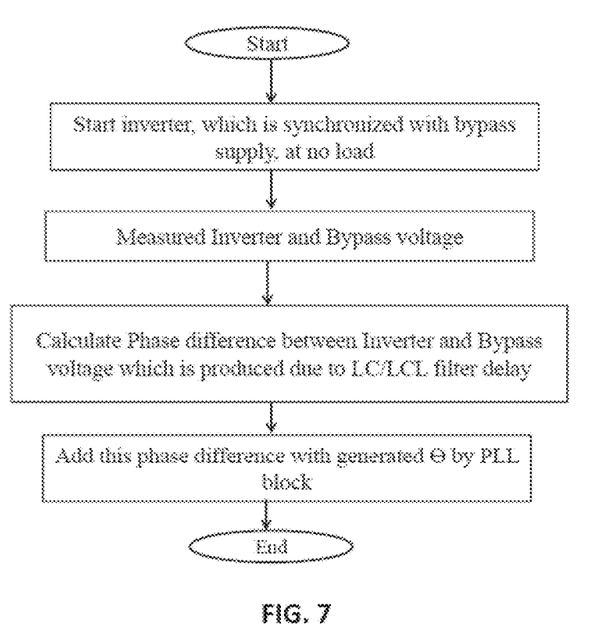
FIG. 7 shows the steps defining functionality of Phase modifier element (E1), in accordance of an embodiment of the present disclosure.

The phase modifier element (E1) determines the phase difference between inverter voltage and bypass voltage even though the inverter generates its voltage by PLL block. In one aspect the phase modifier element (E1) is configured to measure an inverter voltage and a bypass voltage of the UPS wherein the UPS is switched on such that an inverter of the UPS is synchronized with bypass supply at no load. Next, the phase modifier element (E1) may be configured to calculate a phase difference between the inverter voltage and bypass voltage based on the measurement and generate, an updated phase information based on the calculated phase difference and a phase information generated by a phased locked loop (PLL) element of the UPS. In an embodiment, the phase difference may be measured using methods such as frequency domain analysis, Z domain analysis, zero cross detection based method etc. In one embodiment, the steps defining functionality of Phase modifier element (E1) is shown in FIG. 7.

In another embodiment the phase modifier element (E1) may be configured to transmit updated phase information the zero-cross detection based PWM element (E3) wherein the zero-cross detection based PWM element may determine the positive sequence component of the load current based on the updated phase information.

Figure 8:
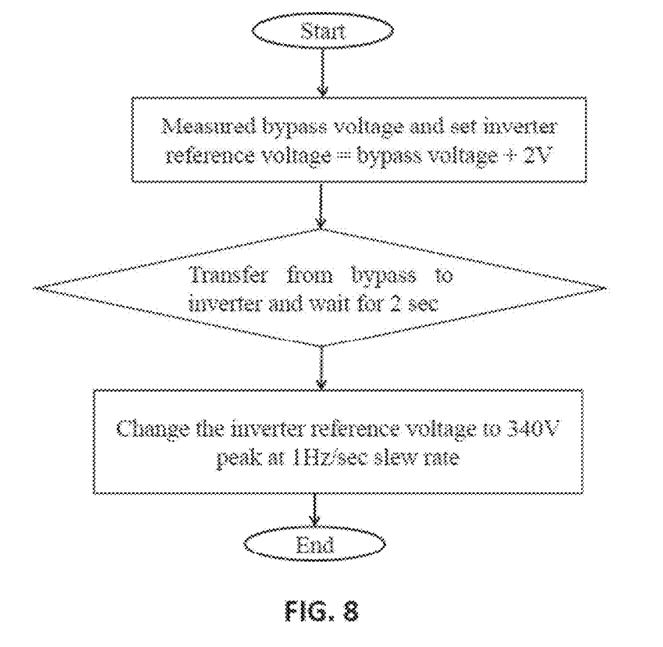
FIG. 8 shows detailed steps of working of Reference Voltage Magnitude Modifier element (E2), in accordance of an embodiment of the present disclosure.

In yet another embodiment as shown in FIG. 4, the disclosed apparatus may further comprise a Reference Voltage Magnitude Modifier element (E2). The detailed steps of working of element (E2), in accordance with an embodiment of the present disclosure is shown in FIG. 8. As may be known to a person skilled in the art power flows from high voltage magnitude to low voltage magnitude, therefore the destination voltage must be set at a higher value than the source voltage to avoid current spike flow from bypass to inverter. The Voltage modifier element may therefore be used to set the reference voltage value higher than bypass voltage. Once the UPS inverter system has changed mode, after certain delay the inverter reference voltage may be changed to 340V (peak) (240 $V_{rms}$) at 1 Hz/sec slew rate.

In other words, as shown in FIG. 8, the voltage modifier element may first be configured to measure a bypass voltage of the UPS set an inverter reference voltage at two volts higher than the measured bypass voltage. Here because of antiparallel static switch (as shown in FIG. 1) the increase of 2V is applicable for both positive and negative cycles. Since the upper switch turns on during the positive cycle and the bottom switch turns on during the negative cycle, the higher voltage reference for inverter may make the reverse bias condition for the thyristor to turn off when transferring from bypass to inverter mode.

Further as illustrated in FIG. 8 the element (E2) may further be configured to transfer the UPS from bypass mode to inverter mode and wait for a predefined time period. In one aspect, the predefined time period may be 2 seconds. Further the phase modifier clock may be configured to and change the inverter reference voltage to 340V peak at a predetermined slew rate after the predetermined time period has elapsed. In another aspect the predetermined slew rate may be 1 Hz/sec.

Figure 9:
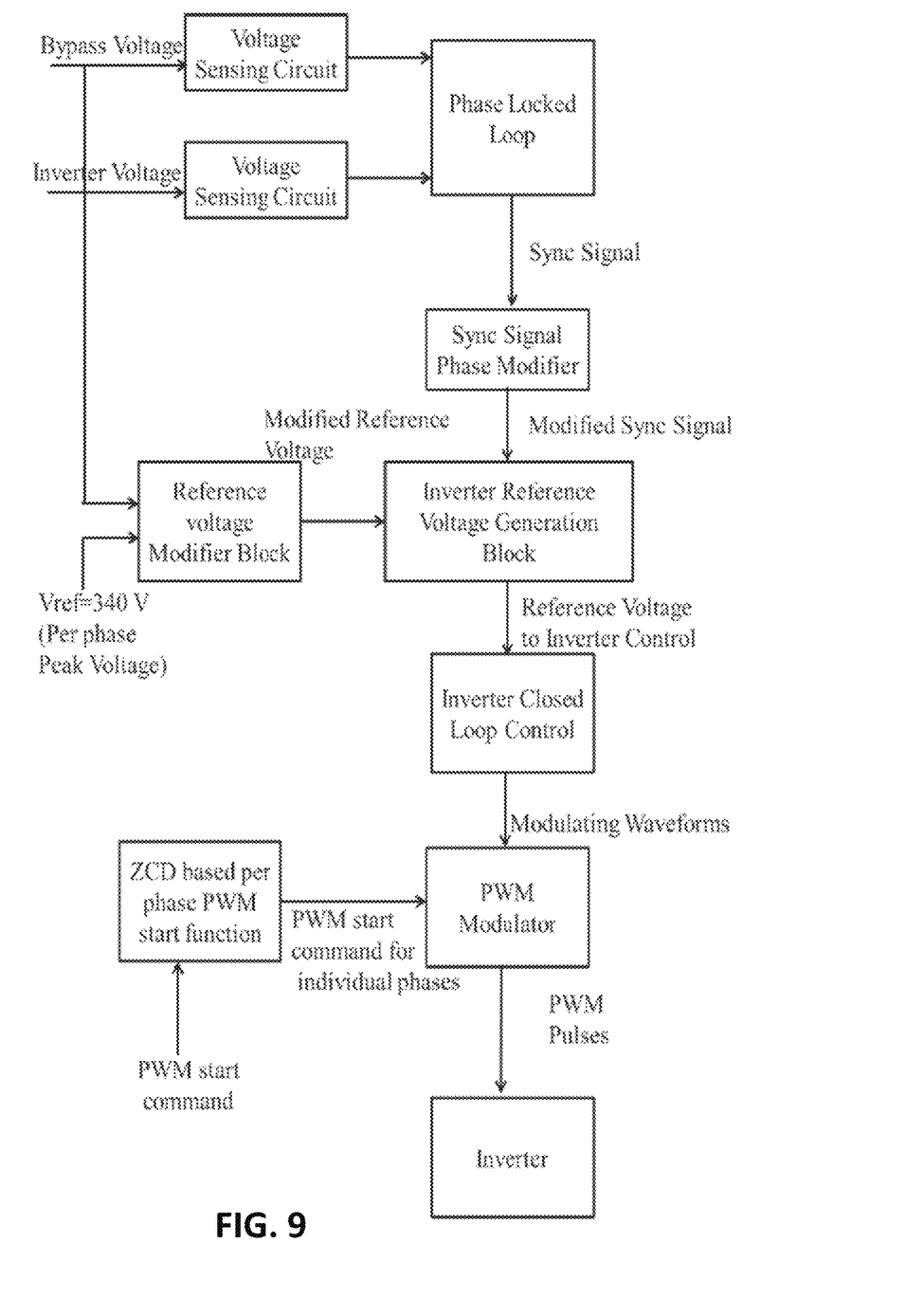
FIG. 9 shows the complete work flow of diagram of the disclosed method and apparatus to reduce current transient during power mode transfer in uninterruptible power supply in accordance with one embodiment of this disclosure.

Reference is further made to FIG. 9, wherein the complete work flow of diagram of the disclosed method and apparatus in accordance with an embodiment of this disclosure is shown. It may be noted that while FIG. 9 and FIG. 4 illustrate the working and connections of all elements (E1, E2 and E3) described herein, these elements (E1, E2 and E3) may form part of a single apparatus or may be used alone or in different permutations and combinations as may be clear to a person skilled in the art. The foregoing illustration may therefore be not treated as limiting but as solely as illustrative for the purpose of explaining the disclosure.

For the sake of clarity, at the cost of repetition it may be noted that although implementations of present subject matter have been described in language specific to structural features and/or methods, it is to be understood that the present subject matter is not necessarily limited to the specific features or methods described. Rather, the specific features and methods are disclosed and explained in the context of a few example implementations any permutation and combination of these implementation which fall within the scope of the following claims read with the disclosure are intended to be covered and protected by this disclosure.

We claim:
1. An uninterruptible power supply, comprising:
    a zero-cross detection based phase width modulated circuit configured to:
        delay activation of a phase width modulation modulator, by delaying a PWM start command for a first delay time, wherein the first delay time is the time between receiving a static switch command to the time when a positive sequence component of a phase load current crosses zero, and
        delay the activation of the PWM modulator for a second delay time after the end of the first delay time, by delaying the PWM start command for the second delay time, wherein the second delay time is based on a power factor of load connected to the UPS.

2. The UPS as claimed in claim 1, wherein the value of first delay time is different based on the zero cross of positive sequence component of the phase load current of respective different phases.

3. The UPS as claimed in claim 1, wherein the second delay time is within a range of 5 micro-seconds to 10 micro seconds.

4. The UPS as claimed in claim 1, further comprising a phase modifier circuit configured to:
    measure an inverter voltage and a bypass voltage of the UPS wherein the UPS is switched on such that an inverter of the UPS is synchronized with bypass supply at no load;
    calculate a phase difference between the inverter voltage and bypass voltage based on the measurement; and generate an updated phase information based on the calculated phase difference and a phase information generated by a phased locked loop element of the UPS.

5. The UPS as claimed in claim 4, wherein the phase modifier circuit generates the updated phase information in operation with an adder wherein generating comprises adding the calculated phase difference and the phase information generated by the phased locked loop element of the UPS.

6. The UPS claimed in claim 1, further comprising a reference voltage magnitude modifier circuit configured to:
measure a bypass voltage of the UPS;
set an inverter reference voltage at two volts higher than the measured bypass voltage;
transfer the UPS from bypass mode to inverter mode and wait for a predefined time period; and
change the inverter reference voltage to 340V peak at a predetermined slew rate after the predetermined time period has elapsed.

7. The UPS as claimed in claim 6, wherein the reference voltage magnitude modifier circuit is configured to wait for the predefined time period of two seconds.

8. The UPS as claimed in claim 6, wherein the reference voltage magnitude modifier circuit is configured to change the inverter reference voltage to 340 V peak at the predetermined slew rate of 1 Hz/sec.

9. The UPS as claimed in claim 4, wherein the phase modifier circuit is configured to transmit updated phase information to the zero-cross detection based PWM element and wherein the zero-cross detection based PWM element determines the positive sequence component of the load current based on the updated phase information.

* * * * *